United States Patent Office 2,912,640
Patented Nov. 10, 1959

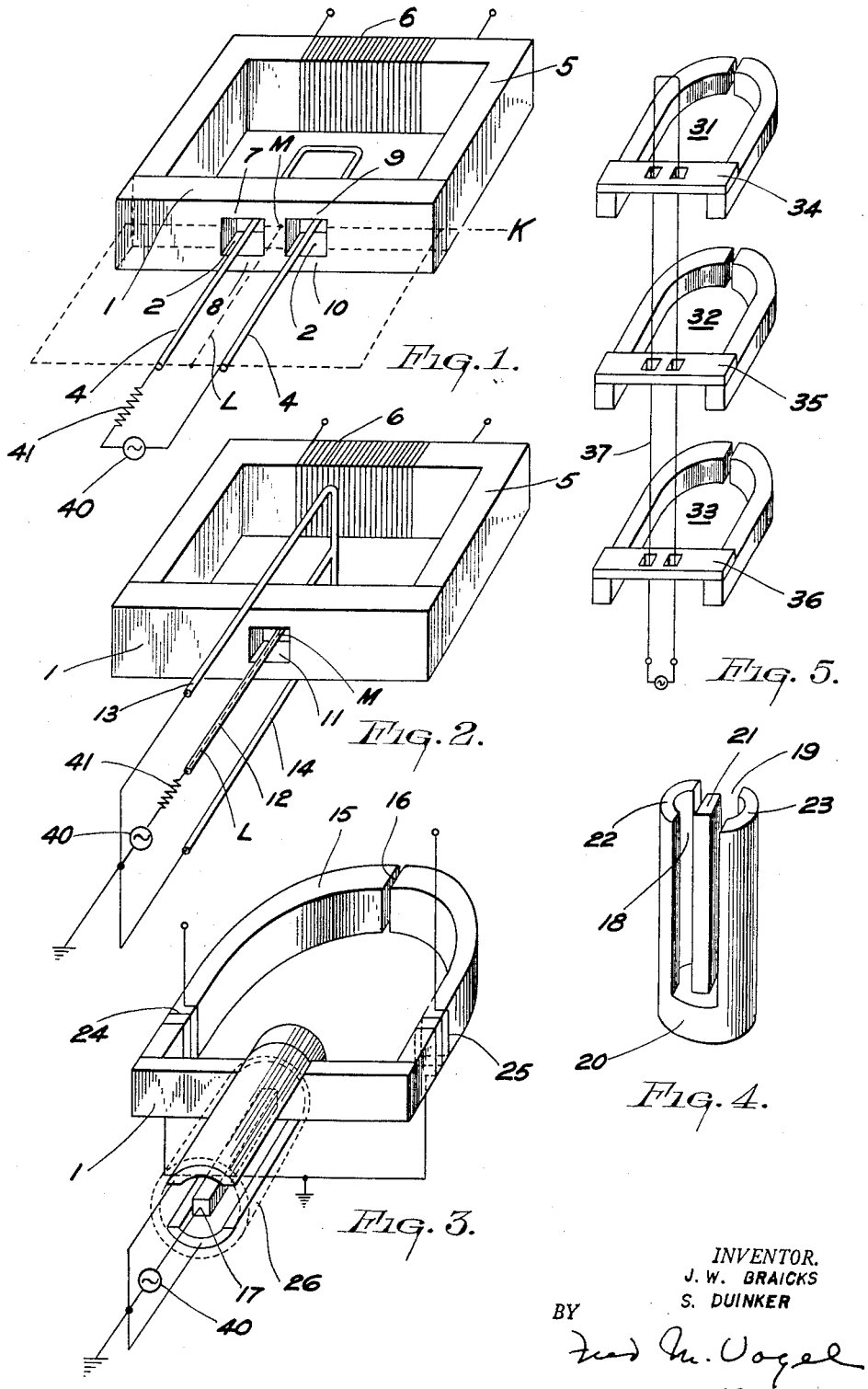

2,912,640

CONTROLLABLE INDUCTOR

Johan Wim Braicks and Simon Duinker, Eindhoven, Netherlands, assignors, by mesne assignments, to North American Philips Company, Inc., New York, N.Y., a corporation of Delaware Application December 2, 1955, Serial No. 550,735

Claims priority, application Netherlands December 6, 1954

5 Claims. (Cl. 323—89)

This invention relates to a variable or controllable inductor, more particularly for high frequencies, consisting of a magnetic circuit including a signal coil having a ferromagnetic core, the inductance of which coil can be varied or controlled by superimposing a magnetic field on the magnetic field produced by an alternating current passing through the coil.

Such inductors may, for example, be used in magnetic modulators, variable resonant circuits, trigger circuits and the like. In these cases the core is provided with a closed yoke and the said further magnetic field is produced by a current passing through a control coil coupled with the yoke. The first-mentioned signal coil is connected to a source of alternating current and the magnetic field produced by this alternating current produces magnetic fluxes in the core, which are acted upon by the magnetic field produced by the current passing through the control coil coupled with the yoke.

Such inductors are also used with magnetic recording and reproducing apparatus and magneto meters. In these cases the core is arranged in a yoke having an air gap and the fluxes occurring in the core produced by a current passing through the first-mentioned coil are acted upon by means of a magnetic field occurring across the air gap.

It is known that with each value of the controlling magnetic field the magnetic reluctance for the fluxes produced by the said alternating current must be substantially the same during the two half periods of the alternating current or, in other terms, the variable inductor must be balanced out as well as possible.

It is also known that particularly with high frequencies of the alternating current passing through the first-mentioned coil the dimensions of the core must be as small as possible. The very small dimensions of the core required for high frequencies (for example from 0.5 to 10 mc./s.) render the manufacture of the core and the winding very difficult. With a view to the winding of the coil around the core, the latter generally consists of separate parts, at least two of which are made of ferromagnetic material and provided with windings and the others serve as supports for the two first-mentioned parts.

However, this construction has various disadvantages. For instance, the winding of the small coils around the sections of ferromagnetic material which have a very small sectional area, is not only difficult in itself but also the two coil halves must be completely identical in order to avoid asymmetrical phenomena between the two sections. Moreover, slightly unequal air gaps between the various parts and unequal dimensions of these parts introduce also asymmetrical phenomena. Finally, the stray capacities of the coils will give rise to troublesome effects at the said high frequencies and also to electrical asymmetrical phenomena between the cores. As stated above, a satisfactory balancing is of essential importance for the satisfactory operation of such a variable inductor; however, the occurrence of the said asymmetrical phenomena practically prevents a satisfactory balancing.

The invention has for its object to provide a construction, in which after the conventional balancing measures have been taken, the said further difficulties disturbing the balancing are reduced considerably.

In accordance with the invention the core of the inductor is constituted by a closed magnetic circuit including a single body of ferromagnetic material, which is provided with one or more holes, the signal coil being constituted by a current conductor passing only once through these holes.

The invention will be described more fully with reference to the figures of the drawing.

Figs. 1, 2 and 3 show embodiments of a variable inductor according to the invention;

Fig. 4 shows a coil used in the embodiment shown in Fig. 3;

Fig. 5 shows diagrammatically an embodiment of a multiple reproducing head of a magnetic recording and reproducing apparatus, in which inductors according to the invention are used.

Referring more particularly to the drawing, Fig. 1 shows one embodiment of a variable inductor according to the invention, which may be used, for example, as a part of a magnetic amplifier. Reference numeral 1 designates the ferromagnetic core of the inductor, comprising a single body preferably of a ferromagnetic material of poor electrical conductivity e.g. a ferrite material. (See Teletech 11,5; May 1952 page 50.) The numerals 2 and 3 designate holes provided within this body, the sectional areas of which are only large enough so that a current conductor can be readily passed through them. With a view to balancing, holes 2 and 3 are formed in a manner such that the body having these holes is symmetrical with respect to a plane of symmetry V passing through the center longitudinal axis K of the body as shown in Fig. 1.

The signal coil of the inductor is constituted by the current conductor 4, which as is evident from Fig. 1, is passed only once through each of the holes 2 and 3. With a view to balancing, this conductor is arranged in a manner such that the line L passing through the center M of the body is an axis of symmetry for the winding formed by the current conductor 4.

Reference numeral 5 designates a closed yoke, also made of ferromagnetic material, on which a control coil 6 is wound. A current traversing this coil 6 produces a magnetic field which acts upon the magnetic fluxes occurring in the body 1 because of the alternating current supplied to the conductor 4 from a source 40.

If the core 1 is made of a sintered, ferromagnetic material, for example such as cubic ferrite, the holes 2 and 3 may, for example, be bored by ultrasonic means. If the core is made of a nickel-iron alloy, the whole strip with the holes may be made in a single punching operation.

If the parts, 7, 8, 9 and 10 of the core have substantially identical geometrical structure, the effect of this balanced structure is not disturbed by air gaps in the core, for instance in case the core were constructed of a plurality of parts. The balancing of the air gaps occurring in this case can be controlled only to a considerably smaller extent than the geometrical identity of the various core sections.

Inequality of the windings cannot occur in this construction, provided, of course, the conductor is of uniform dimensions and homogenous composition throughout.

In view of the occurrence of stray fluxes it is important that the axis of symmetry of the winding 4 should be coincident with the line L, which is the axis of symmetry of the parts of the ferromagnetic body adjacent the holes therein. A deviation between this line and the axis of symmetry produces an asymmetrical effect of the stray fluxes, so that the balancing of the fluxes produced in the core sections 7, 8 and 9, 10 is disturbed.

The occurrence of stray capacities is minimized. Thus the natural resonance of the inductor is very high and cannot substantially adversely affect the balancing.

In the construction shown, both the cross sectional area and the length of the sections 7, 8, 9 and 10 may be very small with respect to the dimensions of the yoke, since these sections need not be provided with windings. On the one hand, this had the advantage that the required energy of the controlling magnetic field produced by the coil 6 may be small and on the other hand, the voltage across the winding 4 is low, so that the capacitative effect is reduced to a minimum. The signal derived from the source 40 and modulated by the control field may be derived across a load 41.

Fig. 2 shows one embodiment of a variable inductor according to the invention in which the body has only one hole. Reference numeral 1 designates again the body of ferromagnetic material, 11 designates the hole in this body, 5 the closed yoke and 6 the signal coil wound on this yoke, to which can be supplied a current for controlling the inductance. The conductor 12 passed through the hole 11 constitutes in this case the signal coil of the variable inductor. Like that of Fig. 1, the conductor 12 extends in a plane of symmetry passing through the center of the hole 11 and the center line of the body 1 and extending parallel to the long sides of the body 1. With a view of the desired symmetry, the signal coil has two parallel conductors 13 and 14 which are connected together at one end to the conductors 12, these conductors 13 and 14 lying also symmetrically with respect to the line L going through the center of the body. Similarly to Fig. 1, the signal is applied from the source 40 and the load 41 represents a circuit that the inventive controllable inductor is controlling.

Fig. 3 shows one embodiment of a variable inductor, in which the signal coil has a shape which safeguards the maintenance of a satisfactorily symmetrical arrangement of the coil with respect to the core, after it is once obtained. Reference numeral 1 designates again the strip of ferromagnetic material having a single hole.

The ferromagnetic core of the embodiment shown in Fig. 3 constitutes part of a reproducing head of a magnetic recording and reproducing apparatus. The core is provided with a yoke 15, having an air gap 16. The magnetic fields occurring across this air gap act upon the fluxes occurring in the core, produced by the current traversing a signal coil 17, coupled with the core. The coil 17 is shown separately in Fig. 4.

The coil is constituted in this case as shown in Fig. 4 by a coaxial system, the inner conductor 21 of which has a section corresponding as far as possible with the section of the hole in the body 1. The sheath 22, 23 of the system has slots 18 and 19, the width of which is substantially equal to the width of the body 1. The sheath and the inner conductor are interconnected conductively by a flat disc 20. After the body has been displaced along the inner conductor 21 until it engages the flat disc 20, the slots and the space between the inner conductor and the outer conductor may, moreover, be filled with an insulating material. If the construction of the coil and the core fulfils the aforesaid requirements of symmetry, the satisfactorily symmetrical arrangement obtained can be maintained without the need for further means.

Returning to Fig. 3, reference numerals 24 and 25 designate the reproducing coils of the reproducing head of the magnetic apparatus. Although the influence of these coils on the balancing of the inductor is slight, it is preferable to arrange these coils symmetrically as far as possible, both from a geometrical and from an electrical point of view, with respect to the body 1 and with the coil 17.

When connecting the coaxial system to the terminals of a source 40 of alternating current, one of the terminals may be connected conductively to the inner conductor 21 and the other terminal to the two sheath parts 22 and 23. It is found, however, that, in order to obtain a satisfactorily symmetrical current distribution in this sheath, it is to be preferred to connect the other terminal of the source of alternating current to a sleeve of good electrical conductivity, which is slipped in intimate contact on the two sheath parts. If this sleeve is arranged, moreover, fittingly on the ferromagnetic body, a very rigid, compact structure is obtained. This sleeve is shown in Fig. 3 in broken lines and designated by 26.

If a magnetic recording and reproducing apparatus comprises a plurality of simultaneously operative reproducing heads, united, if desired, to form a multiple reproducing head, it is advisable to unite the various coils coupled with the ferromagnetic cores to form a single current conductor fed from a source of alternating current common to the various reproducing heads.

It is particularly to be preferred, if the ferromagnetic cores have more than one hole, for the common current conductor to pass first through one set of corresponding holes of the various cores and subsequently to pass through the outer set of corresponding holes.

Fig. 5 shows one embodiment of a multiple reproducing head, in which variable inductors according to the invention are used, i.e. inductors, the ferromagnetic cores of which are provided with two holes. Reference numerals 31, 32 and 33 designate three reproducing heads, provided with ferromagnetic bodies 34, 35 and 36 respectively, these bodies having two holes each. Reference numeral 37 designates the common conductor, which passes first through all left-hand holes and then through all right-hand holes. The three reproducing heads are housed in a common holder (not shown). The reproducing coils of the heads are not shown in Fig. 5.

Both if the cores are provided with one hole and if the cores are provided with two or more holes, the construction of such a structure may be very simple. For example, the various reproducing heads with the coils are first housed in the holder. Then a single conductor can be passed through the various holes, the ends of this conductor being finally connected to a common source of alternating current.

A "closed magnetic circuit" as used herein is intended to include any magnetic circuit in which the principal path for the flux is determined by a ferromagnetic material. Magnetic circuits of this type may or may not include air gaps.

While we have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A controllable inductor adapted for use at frequencies af about 0.5 megacycles per second or higher, comprising a ferromagnetic body having an aperture, said body and aperture therein having at least one common plane of symmetry passing through the center line of the aperture, magnetic circuit means coupled to said ferromagnetic body for introducing in said body a controlling magnetic flux symmetrical with said plane of symmetry, and a signal winding coupled to said ferromagnetic body at said aperture, said winding comprising three conductors electrically connected at one end, one only of said three conductors traversing the aperture in the ferromagnetic body, said three conductors lying substantially in a plane orthogonal to the said plane of symmetry and being otherwise symmetrical with respect thereto.

2. A controllable inductor adapted for use at frequencies of 0.5 megacycles per second or higher, comprising a magnetic circuit including a single elongated ferromagnetic body having an aperture located precisely at the center thereof and symmetrically relative to the entire body, said body and aperture possessing a common plane of symmetry passing through the center line of the body and aperture and extending parallel to the long sides of the body, a signal coil for said inductor including three substantially parallel current conductors extending in a plane orthogonal to the said plane of symmetry with only the center conductor passing only once through said aperture, the ends of said three conductors being connected together and the conductors themselves being otherwise perfectly symmetrical with the said plane of symmetry, and means including an additional magnetic circuit for introducing an additional magnetic field symmetrically through said ferromagnetic body to control the inductance exhibited by the inductor when high-frequency currents traverse the coil.

3. A controllable inductor adapted for use at frequencies of 0.5 megacycles per second or higher, comprising a magnetic circuit including a single elongated ferromagnetic body having an aperture of predetermined configuration located precisely at the center thereof and symmetrically relative to the entire body, said body and aperture possessing a common plane of symmetry passing through the center line of the body and aperture and extending parallel to the long sides of the body, a signal coil for said inductor comprising a conductive member having three, substantially parallel, spaced, projecting portions joined together at one end, said coil being mounted on said body with the center projecting portion traversing and substantially filling the aperture in the body and with the remaining two projecting portions abutting opposite sides of the body and being located perfectly symmetrical to the said plane of symmetry, and means including an additional magnetic circuit for introducing an additional magnetic field parallel to the plane of symmetry and symmetrically through said ferromagnetic body to control the inductance exhibited by the inductor when high-frequency currents traverse the coil.

4. A controllable inductor as set forth in claim 3 wherein the said remaining two projecting portions form parts of a cylinder, and the three projecting portions are joined together at one end by a disc-like cylindrical member.

5. A controllable inductor as set forth in claim 4 wherein a conductive sleeve is mounted on the said remaining two projecting portions and constitutes the means for effecting electrical connection thereto.

References Cited in the file of this patent

UNITED STATES PATENTS

| 2,754,470 | Franklin | July 10, 1956 |
| 2,799,822 | Dewitz | July 16, 1957 |

FOREIGN PATENTS

| 110,935 | Sweden | June 20, 1944 |

OTHER REFERENCES

Weis: (Abstract), 383,526, May 18, 1943.